April 10, 1951  F. J. HIRSCH  2,548,022
DISCHARGE CHUTE AND COMBINED VALVE AND AGITATOR
ACTUATED BY MATERIAL BEING DISPENSED
Filed Oct. 10, 1949
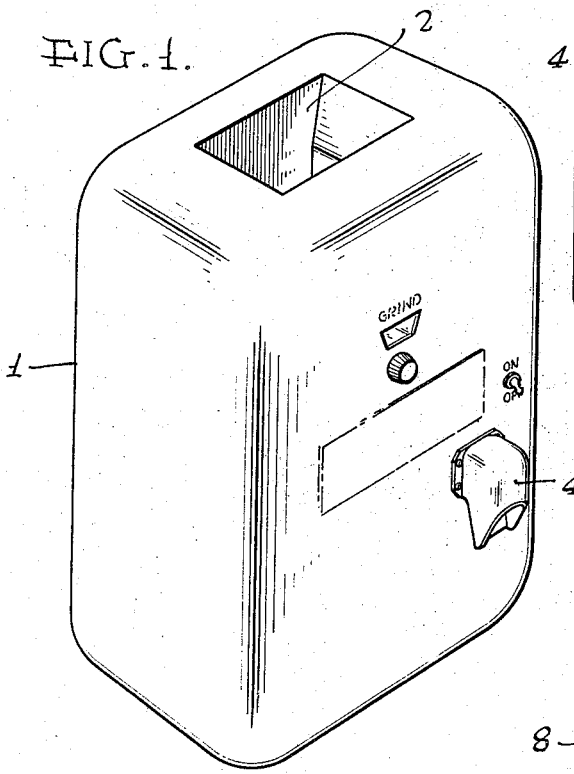
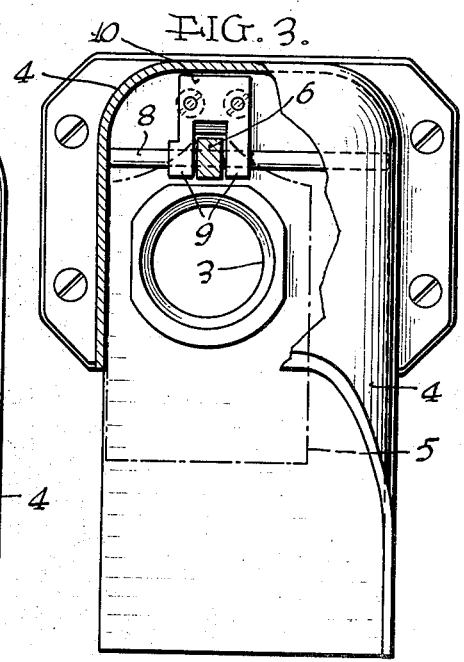
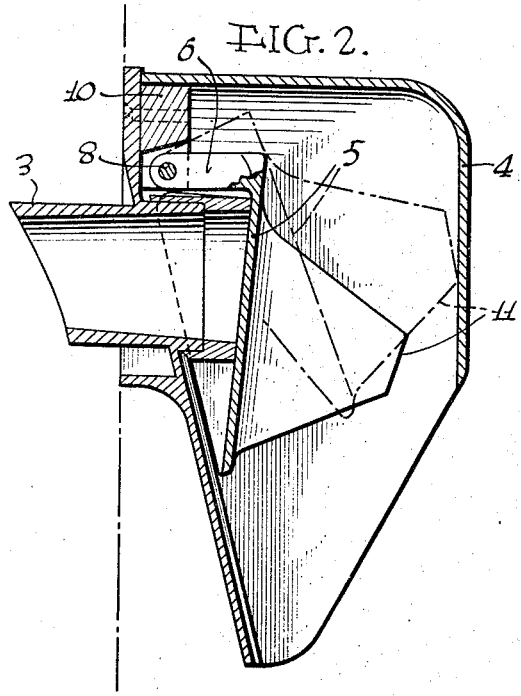
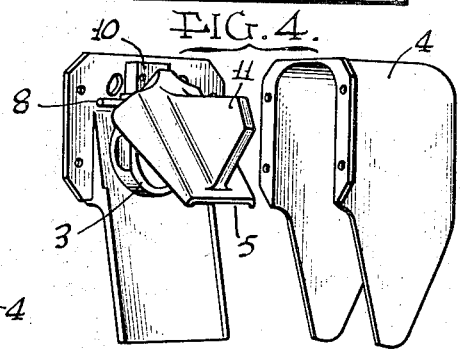
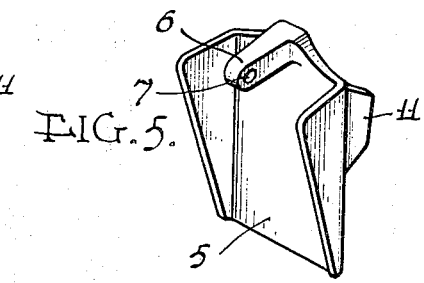
Inventor:
Frank J. Hirsch
by his Attorneys
Howson & Howson Patented Apr. 10, 1951

2,548,022

UNITED STATES PATENT OFFICE 2,548,022

DISCHARGE CHUTE AND COMBINED VALVE AND AGITATOR ACTUATED BY MATERIAL BEING DISPENSED

Frank J. Hirsch, Philadelphia, Pa., assignor to The Enterprise Manufacturing Co. of Pa., Philadelphia, Pa., a corporation of Pennsylvania Application October 10, 1949, Serial No. 120,497

4 Claims. (Cl. 222—196)

This invention relates to new and useful improvements in coffee and like mills for finely grinding materials. More particularly the invention relates to coffee mills of the power-operated type extensively employed in grocery stores, supermarkets and the like.

In mills of the type described, the material as it is ground is discharged from the mill through a chute or opening in the casing usually into a hood or housing which surrounds and overlies the chute and functions to deflect and direct the ground material into the mouth of a paper bag or other suitable container positioned to receive the same.

One of the difficulties encountered in mills of this type, and particularly in connection with coffee, is the fact that the interior surface of the hood or housing into which the coffee is discharged becomes coated with coffee fines and dust and as coffee continues to be ground in and discharged from the mill the layer of coffee fines and dust continues to build-up on the interior of the hood or housing with the result that if the latter is not periodically removed and cleaned the collected coffee fines and dust become rancid thereby creating an obnoxious, if not an unhealthy condition. Consequently, in such cases, it is desirable to maintain the interior surface of the hood or housing substantially free from the collection of coffee fines and dust.

With the foregoing in mind, a principal object of the present invention is to provide in a mill of the character set forth a novel valve or closure for the discharge chute which is operable automatically to prevent the collection and building-up of fines and dust on the interior surface of the hood or housing which surrounds the discharge.

Another object of the invention is to provide in a mill of the stated character an automatically operable valve or closure for the discharge chute which is of relatively simplified construction and operation, comparatively inexpensive to manufacture and install, and which is entirely effective and foolproof in operation and use.

These and other objects of the invention and the various features and details of the construction and operation thereof are hereinafter fully set forth and described with reference to the accompanying drawing, in which:

Fig. 1 is a view in perspective of a power-operated coffee mill of the type in conjunction with which the present invention is adapted to be employed;

Fig. 2 is an enlarged vertical sectional view through the discharge chute and hood of the coffee mill showing said chute provided with a valve or closure constructed and arranged in accordance with the present invention;

Fig. 3 is an enlarged front elevational view of the disclosure in Fig. 2 showing the valve or closure in broken lines and with a portion of the hood or housing cut-away to better illustrate the discharge chute and the manner of mounting the valve or closure with respect thereto;

Fig. 4 is a perspective view in relatively separated relation of the discharge chute with its valve closure and the discharge hood or housing; and Fig. 5 is a view in perspective of a valve or closure member made in accordance with the present invention.

Referring now more particularly to the drawing, reference numeral 1 designates generally a more or less conventional type power-operated mill, for example, for grinding coffee such as used in grocery stores, supermarkets and the like. The coffee is inserted into the hopper of the mill through an opening designated at 2 in the top thereof and the ground material is discharged from the mill through a suitable chute 3 into a hood or housing 4 which directs the ground coffee downwardly into the usual paper coffee bag or other container (not shown).

According to the present invention there is provided for the outer end of the discharge chute 3 a valve or closure 5. In the illustrated embodiment of the invention the valve or closure 5 has its upper edge a centrally located inwardly projecting leg 6, and this leg 6, adjacent its free end, is provided with an opening 7 therethrough which loosely receives a mounting pin 8. The mounting pin 8 is in turn supported by a pair of horizontally spaced hub portions 9 of a bracket member 10 which is secured to the mill above the discharge chute 3. These hub portions 9 are provided with aligned openings therethrough in which the pin 8 is removably disposed and the pin 8 has a length substantially the width of the hood 4 so that it is retained against lateral displacement by the opposite side walls of said hood 4.

As previously stated, the mounting of the valve leg 6 upon the pin 8 is relatively loose and, in addition to this, the width or thickness of the valve leg 6 is less than the space between the bracket hub portions 9 so that a reasonable amount of play or clearance is provided for the leg portion 6 intermediate these hub portions 9. By this construction of the loose mounting of the leg 6 on the pin 8 and the clearance between said leg and the hub portions 9, lateral freedom is afforded the valve or closure 5 to an extent which provides limited lateral rocking movement of the valve 5 under the impact of the ground coffee as it is discharged from the chute 3 and impinges on the said closure or valve 5.

In addition to the lateral rocking movement of the valve or closure 5 there is imparted to the latter by the discharging ground coffee a swinging movement in a direction toward and away from the outlet end of the discharge chute 3. In order to limit outward swinging movement of the closure or valve 5 with respect to the chute 3 and also to provide for an engagement of the hood or housing 4 by the valve 5 there is provided on the outer face of the latter a projecting vertical fin or the like 11 which is dimensioned to engage the inner surface of the outer wall of the hood or housing 4 thereby striking the latter while at the same time limiting outward swinging movement of the said closure or valve.

The construction and arrangement of the closure or valve 5 and its offset pivotal mounting is such that when the mill is not operating the valve or closure 5 will be disposed in closing relation against the end of the discharge chute 3 as shown in solid lines in Fig. 2 of the drawing. Likewise, the construction and arrangement of the closure 5 are such that the force of the ground coffee discharge from the chute 3 operates to actuate the closure or valve 5 outwardly away from the chute 3 to effect discharge of the ground coffee and at the same time engage the free edge of the fin 11 with the hood or housing 4 as previously described.

By the present invention, when the mill is in operation discharging ground coffee from the chute 3 causes the valve or closure 5 to oscillate back and forth between the solid and broken-line positions shown in Fig. 2 and at the same time to undergo a lateral rocking movement. These combined lateral rocking and swinging movements of the valve or closure 5 operate to jar or vibrate the hood or housing 4 and effectively dislodge coffee fines and dust which may tend to collect on the interior surface of the hood or housing 4. The reason for this is that just as soon as any particles of coffee start to collect on the inner surface of the hood they are immediately jarred loose by the vibrations generated in the hood 4 by the lateral rocking and swinging movements of the valve or closure 5.

From the foregoing, it will be observed that the present invention provides a mill of the character set forth having a novel valve or closure for the discharge chute which is operable automatically to prevent the collection and building-up of fines and dust on the interior surface of the hood or housing which surrounds the discharge. The invention further provides a mill having a novel discharge valve which is of relatively simplified construction and operation, comparatively inexpensive to manufacture and install and which is entirely effective and foolproof in operation and use.

While a particular embodiment of the invention has been described and illustrated herein, it is not intended to limit the invention to such disclosure, and changes and modifications may be made therein and thereto within the scope of the following claims.

I claim:

1. In a mill having a discharge chute through which finely ground material is discharged into a downwardly opening hood member which surrounds the chute outlet and operates to deflect and direct the discharged ground material downwardly, a valve closure for the chute outlet, means eccentrically pivoting the valve closure for swinging movement toward and away from the chute outlet and unbalancing the member to chute closing position when the mill is idle, said eccentric mounting of the valve member being relatively loose and providing limited lateral rocking movement thereof relative to the chute, and the valve member being engaged by the ground material discharge from the chute and actuated thereby in lateral rocking and confronting swinging movements to generate vibrations in the hood and effect dislodgement of particles of the ground material which collect upon the interior surface.

2. In a mill having a discharge chute through which finely ground material is discharged into a downwardly opening hood member which surrounds the chute outlet and operates to deflect and direct the discharged ground material downwardly, a valve closure for the chute outlet, means eccentrically pivoting the valve closure for swinging movement toward and away from the chute outlet and providing limited lateral rocking movement of the valve closure relative to the chute, and means dimensioned to strike the hood and limit outward swinging movement of the valve member, the valve member being pivotally unbalanced to chute closing position when the mill is idle and when the mill is in operation being engaged by the ground material discharged from the chute and actuated thereby in lateral rocking and confronting swinging movements to generate vibrations in the hood which effect dislodgement of particles of the ground material that collect upon the interior surface of the hood.

3. In a mill having a discharge chute through which finely ground material is discharged into a downwardly opening hood member which surrounds the chute outlet and operates to deflect and direct the discharged ground material downwardly, a valve closure for the chute outlet having at its upper edge a projection in the direction of the mill, a pin extending loosely through an opening in said projection to pivotally mount the valve closure for swinging movement toward and away from the chute outlet and providing limited lateral rocking movement of the valve closure relative to the chute, and means on the valve dimensioned to strike the hood and limit outward swinging movement of the valve member, the valve member being pivotally unbalanced to chute closing position when the mill is idle and when the mill is in operation being engaged by the ground material discharged from the chute and actuated thereby in lateral rocking and confronting swinging movements to generate vibrations in the hood which effect dislodgement of particles of the ground material that collect upon the interior surface of the hood.

4. In a mill having a discharge chute through which finely ground material is discharged into a downwardly opening hood member which surrounds the chute outlet and operates to deflect and direct the discharged ground material downwardly, a valve closure for the chute outlet having at its upper edge a projection in the direction of the mill, a pin extending loosely through an opening in said projection to pivotally mount the valve closure for swinging movement toward and away from the chute outlet, relatively spaced hubs mounting the pin at respectively opposite sides of the projection and with said loose pivotal mounting thereof providing limited lateral rocking movement of the valve closure relative to the chute, and a second projection on the outer side of the valve dimensioned to strike the hood and limit outward swinging movement of the valve member, the valve member being pivotally unbalanced to chute closing position when the mill is idle and when the mill is in operation being engaged by the ground material discharged from the chute and actuated thereby in lateral rocking and confronting swinging movements to generate vibrations in the hood which effect dislodgement of particles of the ground material that collect upon the interior surface of the hood.

FRANK J. HIRSCH.

REFERENCES CITED

The following references are of record in the file of this patent:

UNITED STATES PATENTS

| Number | Name | Date |
|---|---|---|
| 836,190 | Judd | Nov. 20, 1906 |
| 1,622,318 | Janer | Mar. 29, 1927 |